United States Patent
Kato

(10) Patent No.: US 9,132,875 B2
(45) Date of Patent: Sep. 15, 2015

(54) ATTACHMENT STRUCTURE FOR WINDSHIELD OF VEHICLE

(71) Applicant: KAWASAKI JUKOGYO KABUSHIKI KAISHA, Hyogo (JP)

(72) Inventor: Hideyuki Kato, Hyogo (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 13/659,111

(22) Filed: Oct. 24, 2012

(65) Prior Publication Data

US 2013/0099521 A1  Apr. 25, 2013

(30) Foreign Application Priority Data

Oct. 25, 2011  (JP) .................. 2011-234117

(51) Int. Cl.
*B62J 17/04* (2006.01)
(52) U.S. Cl.
CPC ...................... *B62J 17/04* (2013.01)
(58) Field of Classification Search
CPC ........................................................ B62J 17/04
USPC ........................................................ 296/78.1
See application file for complete search history.

(56) References Cited

U.S. PATENT DOCUMENTS

| | | | |
|---|---|---|---|
| 6,543,831 B2 * | 4/2003 | Takemura et al. | 296/78.1 |
| 7,832,783 B1 * | 11/2010 | Stadnyk | 296/78.1 |
| 7,946,642 B1 * | 5/2011 | Wu | 296/78.1 |
| 2002/0041107 A1 | 4/2002 | Takemura et al. | |
| 2007/0296237 A1 * | 12/2007 | Anderson | 296/78.1 |
| 2008/0197658 A1 | 8/2008 | Yoshitake et al. | |
| 2009/0189413 A1 | 7/2009 | Misaki et al. | |
| 2011/0101724 A1 | 5/2011 | Wu | |

FOREIGN PATENT DOCUMENTS

| | | |
|---|---|---|
| EP | 2 082 951 | 7/2009 |
| JP | 4-104086 | 9/1992 |
| JP | 2000-002361 | 1/2000 |
| JP | 2002-096783 | 4/2002 |

OTHER PUBLICATIONS

European Search Report issued Feb. 15, 2013 in European Patent Application No. EP 12 18 9714.

* cited by examiner

*Primary Examiner* — Glenn Dayoan
*Assistant Examiner* — Melissa A Black
(74) *Attorney, Agent, or Firm* — Wenderoth, Lind & Ponack, L.L.P.

(57) ABSTRACT

An attachment structure for a windshield is provided in an upper part of a vehicle body front part of a vehicle for easing wind pressure to a driver. The structure includes a plate attached to the windshield, a shield stay attached to a vehicle body, and a clamp capable of fastening the plate and the shield stay from the front and rear sides. The clamp includes an operation portion capable of manually operating fastening and fastening cancellation. By operating the operation portion so as to cancel the fastening of the clamp, the plate is movable upward and downward along the shield stay.

10 Claims, 8 Drawing Sheets

FRONT SIDE ←⎯⎯⎯

ATTACHMENT STRUCTURE FOR WINDSHIELD OF VEHICLE

TECHNICAL FIELD

The present invention relates to an attachment structure for a windshield of a vehicle such as a motorcycle.

BACKGROUND ART

Conventionally, in a certain windshield attached to an upper part of a front cowl covering a vehicle body front part of a motorcycle, a position thereof in the up and down direction can be changed. For example, Patent Literature 1 discloses a configuration in which vertically long holes extending upward and downward are provided in support rods supporting a windshield. By moving support positions of the windshield upward and downward in the vertically long holes, a position of the windshield in the up and down direction is changed.

CITATION LIST

Patent Literature

[PTL 1] Japanese Laid-Open Utility Model Publication No. 4-104086

Technical Problem

However, with the attachment structure for the windshield as in Patent Literature 1, in order to change the position of the windshield in the up and down direction, a task of "after loosening all screws of the vertically long holes by a tool such as a screw driver, moving the windshield upward and downward so as to determine the position in the up and down direction, and then fastening all the loosened screws again by the screw driver", and the tool such as a screw driver are required. Thus, a task of changing the position of the windshield is complicated.

Therefore, an object of the present invention is to provide an attachment structure for a windshield capable of more easily manually changing a position of the windshield.

SUMMARY OF THE INVENTION

The present invention is an attachment structure for a windshield provided in an upper part of a vehicle body front part of a vehicle for easing wind pressure to a driver, including a plate attached to the windshield, a shield stay attached to a vehicle body, and a clamp capable of fastening the plate and the shield stay from the front and rear sides. The clamp includes an operation portion capable of manually operating fastening and fastening cancellation. By operating the operation portion so as to cancel the fastening of the clamp, the plate is movable upward and downward along the shield stay.

According to the above configuration, the fastening and the fastening cancellation of the plate and the shield stay can manually be operated by the operation portion. Thus, without using a tool, the windshield can be moved. That is, a position of the windshield can easily manually be changed.

The present invention preferably includes the following configurations.

(1) A long hole extending in the up and down (vertical) direction is formed in one of the shield stay and the plate, a guide portion is provided in the other of the shield stay and the plate, and the guide portion is fitted to both left and right side edges of the long hole.

(2) In the configuration (1), when the plate is moved upward and downward along the shield stay, the guide portion is abutted with an upper end or a lower end of the long hole so as to regulate upward movement or downward movement of the plate.

(3) The operation portion is provided on the one end side in the windshield thickness direction of the clamp.

(4) The operation portion is placed on the front side of the windshield.

(5) In the any one of the configurations (1) to (4), the clamp has a screw type securing structure for operating the fastening and the fastening cancellation by rotating the operation portion. The clamp includes an axial portion having an axial part to be inserted into the long hole and the plate and a head part having a larger diameter than the axial part, and the operation portion and the axial portion are screwed together.

(6) The clamp includes a retaining member for regulating movement of the operation portion in the detachment direction.

(7) The operation portion includes a grip part to be gripped, and an operation axial part coupled to the grip part, and a hole into which the operation axial part is inserted is formed in the windshield.

According to the configuration (1), the guide portion is fitted to both the left and right side edges of the long hole. Thus, the plate to which the windshield is attached can be prevented from inclining relative to the long hole, so that the windshield can smoothly be moved.

According to the configuration (2), the upward movement or the downward movement of the plate is regulated. Thus, a moving amount of the windshield can be regulated.

According to the configuration (3), the operation portion is placed on the one end side of the clamp. Thus, the operation portion and the clamp are placed on one axis. As a result, a configuration for transmitting a force applied to the operation portion to the clamp can be simplified.

Fewer members are arranged around the front side of the windshield than the rear side. Thus, the driver can easily access the front side. Therefore, according to the configuration (4), contact between the operation portion and other members can be prevented, and the operation portion can easily be operated.

The configuration (5) is the specific securing structure of the clamp. By applying the present securing structure, the fastening and the fastening cancellation can easily be operated by rotating the operation portion.

According to the configuration (6), by the retaining member, the operation portion can be prevented from being detached and dropped. Further, loss of the operation portion can be prevented.

According to the configuration (7), damage to the windshield by the operation portion can be prevented.

Advantageous Effects of Invention

In summary, according to the present invention, the position of the windshield can easily manually be changed.

DETAILED DESCRIPTION OF THE INVENTION

Figure 1:
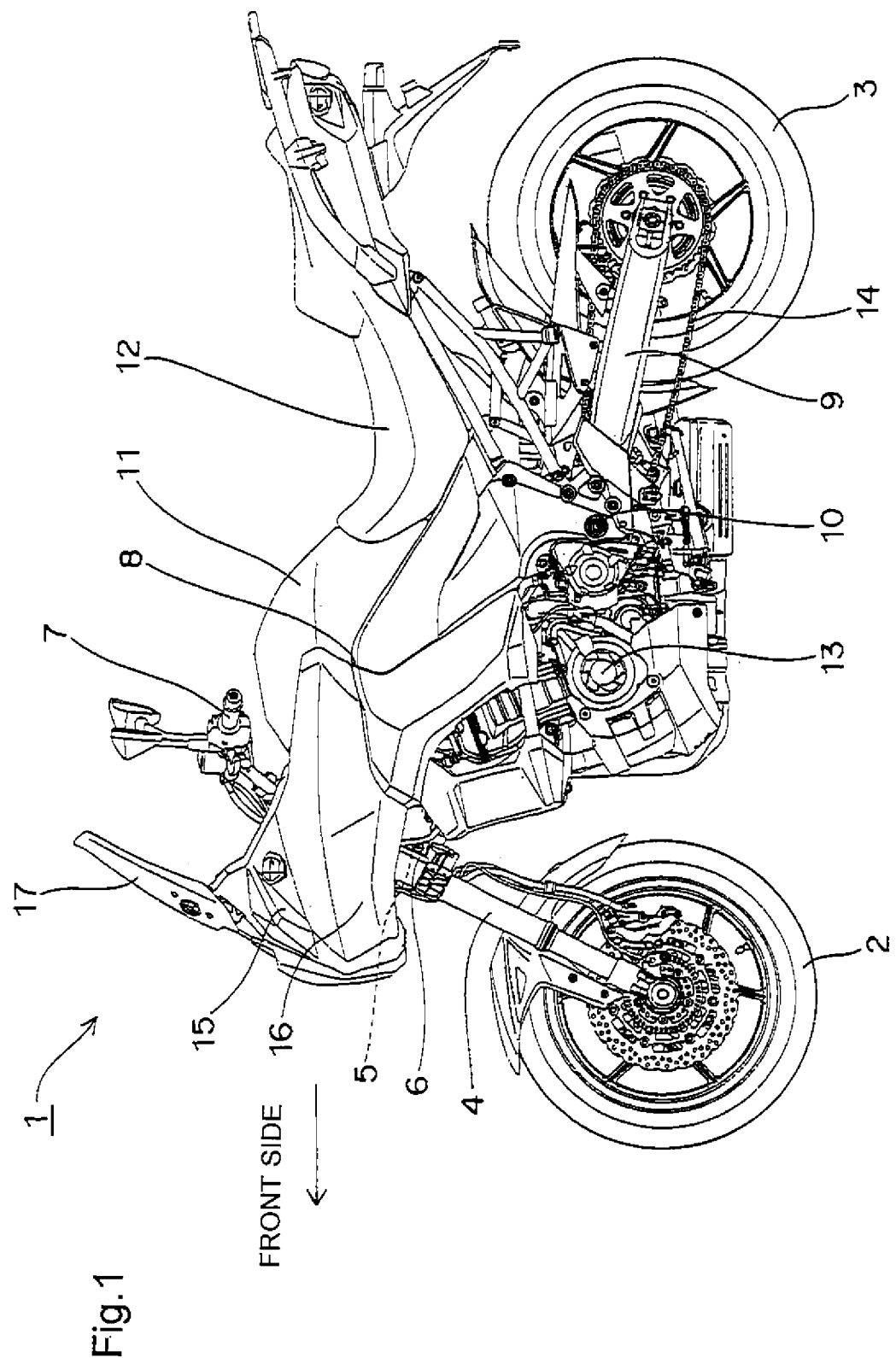
FIG. 1 is a left side view of a motorcycle provided with an attachment structure for a windshield according to an embodiment of the present invention.

FIG. 1 is a left side view of a motorcycle 1 provided with an attachment structure for a windshield according to an embodiment of the present invention. It should be noted that the concept of the direction used in the present embodiment matches with the concept of the direction seen from a driver of the motorcycle 1.

As shown in FIG. 1, the motorcycle 1 includes a front wheel 2 and a rear wheel 3, and the front wheel 2 is rotatably supported on a lower part of a front fork 4 extending in the substantially up and down (vertical) direction. The front fork 4 is supported by a steering shaft 5. The steering shaft 5 is rotatably supported by a head pipe 6. A bar type steering handle 7 extending leftward and rightward is attached to an upper bracket (not shown) provided in an upper end of the front fork 4. Therefore, when the driver oscillates the steering handle 7 leftward and rightward, the front wheel 2 is steered taking the steering shaft 5 as a rotation shaft.

A vehicle body frame 8 extends rearward from the head pipe 6. A front end of a swing arm 9 is pivotably supported on a rear lower end of the vehicle body frame 8 by a pivot bolt 10, and the rear wheel 3 is rotatably supported on a rear end of the swing arm 9. A fuel tank 11 is arranged on the upper side of the vehicle body frame 8 and on the rear side of the steering handle 7, and a driver seat 12 is arranged on the rear side of the fuel tank 11. An engine 13 is mounted on the lower side of the fuel tank 11. An output sprocket (not shown) is arranged in a rear part of the engine 13, and motive power of the output sprocket is transmitted to the rear wheel 3 via a chain 14.

A headlight 15 is arranged on the front side of the steering handle 7, and the headlight 15 is covered by a front cowl 16. The front cowl 16 is a half-cowl type of covering which covers an upper part of a front part of a vehicle body such as the headlight 15 and not covering the engine 13 and the like. A windshield 17 for easing wind pressure to the driver is arranged in an upper part of the front cowl 16. The windshield 17 is curved so as to have a forward convex shape, and formed by a transparent resin plate in order to ensure visibility of the front side of the driver.

Figure 2:
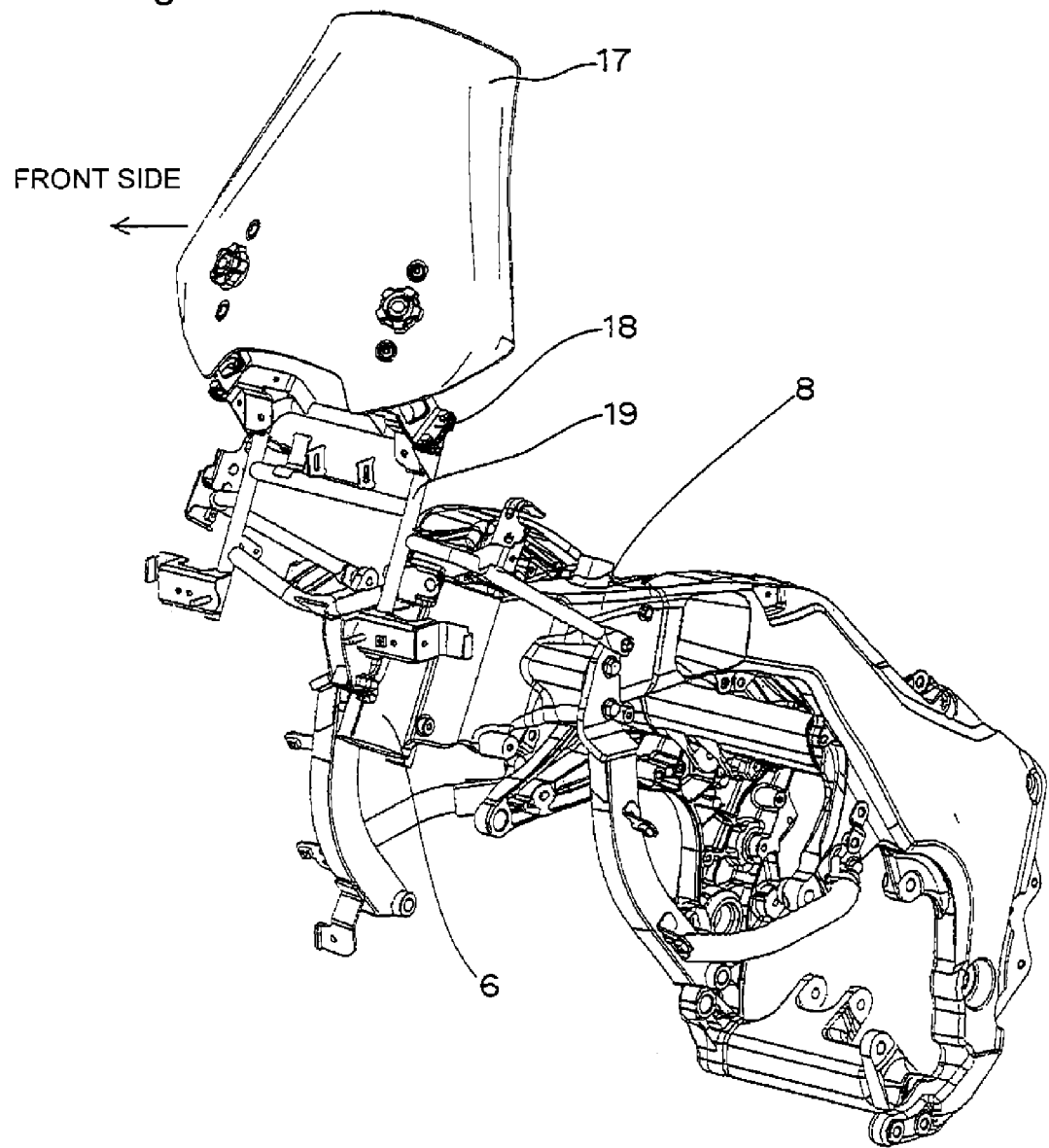
FIG. 2 is a front side perspective view of a vehicle body frame of the motorcycle of FIG. 1.

FIG. 2 is a front side perspective view of the vehicle body frame 8 of the motorcycle 1 of FIG. 1. The windshield 17 is attached to a pair of left and right shield stays 18 provided toward the front side. The pair of left and right shield stays 18 is coupled by a coupling member 19 extending in the lateral direction. The coupling member 19 is attached to a front end of the vehicle body frame 8.

Figure 3:
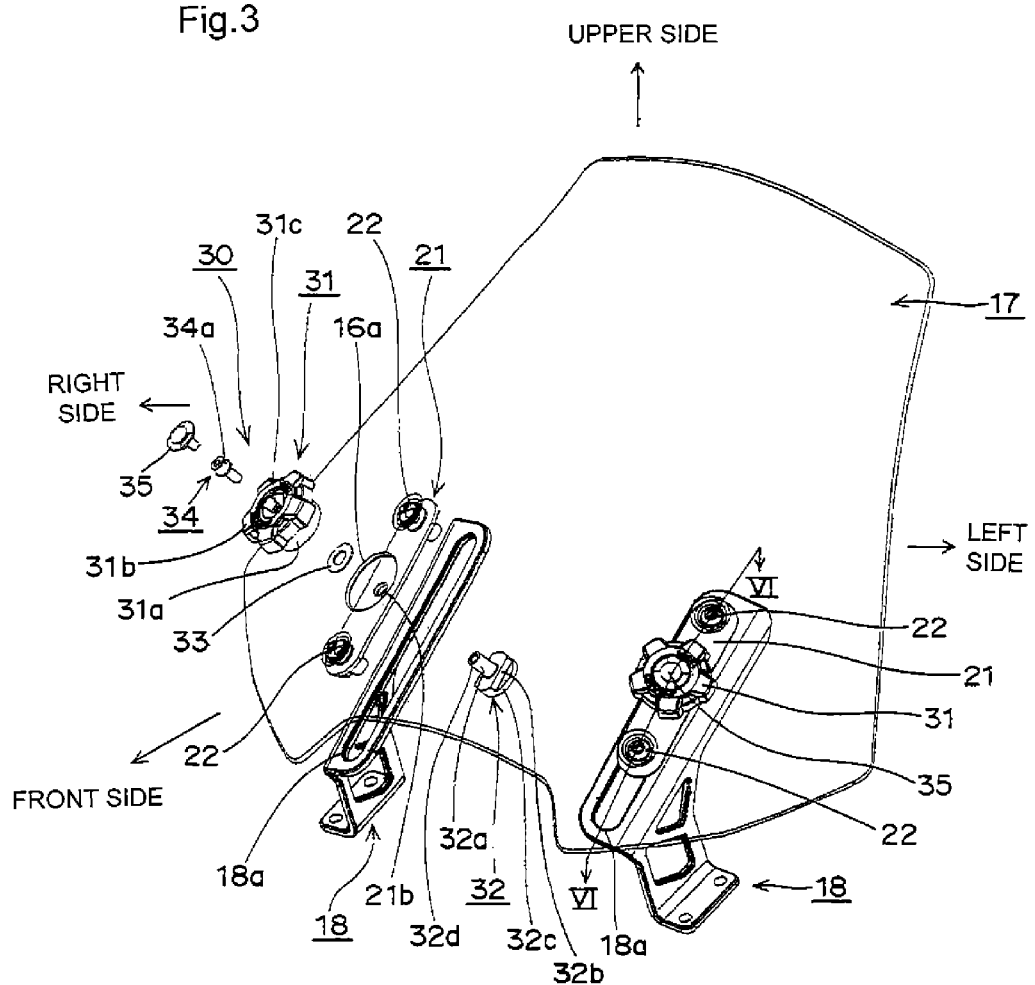
FIG. 3 is an enlarged view of a windshield part of FIG. 2.

FIG. 3 is an enlarged view of a windshield 17 part of FIG. 2. In FIG. 3, one of left and right attachment structures for a windshield (right) is shown in an exploded view. As shown in FIG. 3, a pair of left and right holes 16a is formed in the windshield 17. Plates 21 are attached to a rear surface of the windshield 17 by bolts 22 inserted from a front surface of the windshield 17. Long holes 18a extending in the up and down (vertical) direction are formed in the shield stays 18. It should be noted that, although the windshield 17 is formed by a transparent resin plate as described above, parts of the windshield 17 covering the plates 21 and the shield stays 18 are formed to be uneven so that the plates 21 and the shield stays 18 are not easily visually recognized from the front side.

Figure 4:
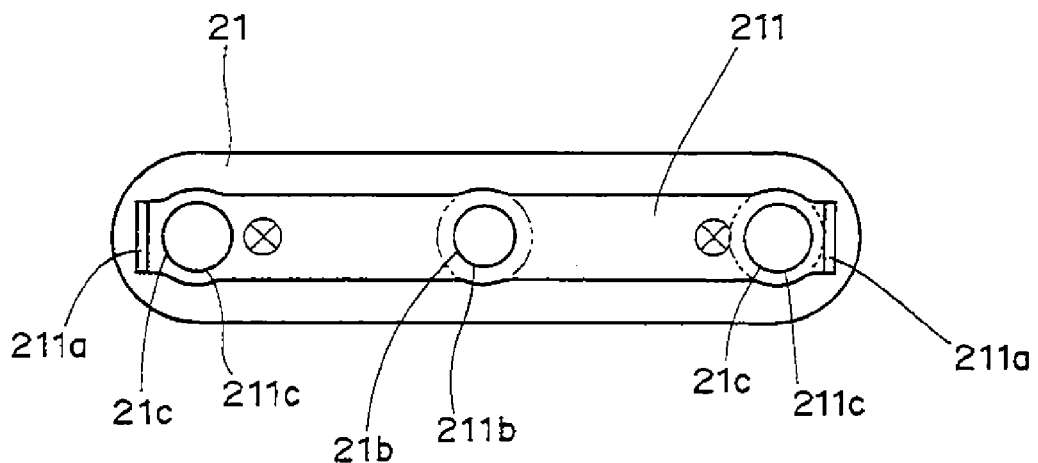
FIG. 4 is a rear surface view of a plate.
Figure 5:
FIG. 5 is a side view of the plate.

FIG. 4 is a rear surface view of the plate 21, and FIG. 5 is a side view of the plate 21. The plate 21 is formed to be long in the up and down direction, and a guide member (guide portion) 211 formed to be long in the same direction as the plate 21 is attached to a rear surface of the plate 21. Projection portions 211a protruding rearward are formed in upper and lower ends of the guide member 211. A hole 21b and a hole 211b matching with the hole 16a which is formed in the windshield 17 are respectively provided in center parts in the longitudinal direction of the plate 21 and the guide member 211, and holes 21c, 211c into which the bolts 22 are inserted are respectively provided in both ends in the longitudinal direction of the plate 21 and the guide member 211. The projection portions 211a are placed on the outer sides in the up and down direction of the holes 211c.

As shown in FIG. 3, the plate 21 attached to the windshield 17 is fastened to a front surface of the shield stay 18 by a clamp 30. The clamp 30 has a manually rotatable knob (operation portion) 31 having a nut part 31c, a tubular axial bolt (axial portion) 32 having a head part 32c screwed to the knob 31, a washer 33, a retaining bolt (retaining member) 34, and a cap 35. By screwing the knob 31 and the tubular axial bolt 32 together, the plate 21 and the shield stay 18 are fastened from the front and rear sides in the running direction. In other words, the clamp 30 is configured so that a clamping force is applied in a thickness direction of the windshield, as can be seen from FIG. 6. As a result, the windshield 17 to which the plate 21 is attached is placed at a predetermined position relative to the shield stay 18. The knob (operation portion) 31 is provided in a front end of the clamp 30 in the windshield 17 thickness direction, and placed in the vicinity of a front part of the windshield 17. The knob 31 and the tubular axial bolt 32 are placed in a substantial center in the up and down direction between the upper and lower bolts 22 for attaching the plate 21 to the windshield 17.

Figure 6:
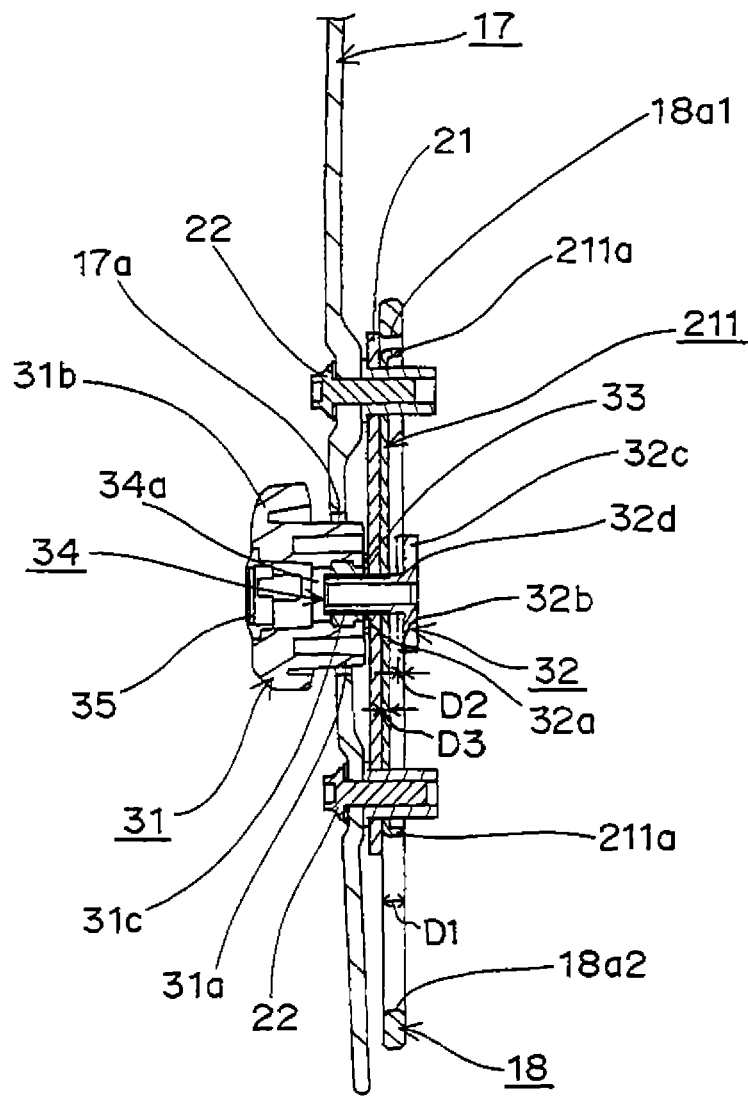
FIG. 6 is a sectional view by line VI-VI of FIG. 3.

FIG. 6 is a sectional view by line VI-VI of FIG. 3. In a state in which the clamp 30 fastens the plate 21 and the shield stay 18 from the front and rear sides, the knob 31, the washer 33, the plate 21, the shield stay 18, and the tubular axial bolt 32 are placed in order from the front side. A rearward-protruding operation axial part 31a of the knob 31 is inserted into the hole 16a of the windshield 17, an axial part 32a of the tubular axial bolt 32 is inserted into the long hole 18a of the shield stay 18, the holes 21b, 211b of the plate 21 and the guide member 211, and the washer 33, so that the knob 31 and the tubular axial bolt 32 are screwed together. In the knob (operation portion) 31, in order to rotate the operation axial part 31a with a smaller force than a case in which the operation axial part 31a is directly rotated, a grip part 31b has a larger diameter than the operation axial part 31a and is formed to have such size that the driver can grip the grip part. A plurality of concave parts is formed at intervals on an outer peripheral surface of the grip part 31b in such a manner that radial size of an outer peripheral part of the grip part 31b is changed in the circumferential direction, and the concave parts are formed in a shape for supporting fingers of the driver.

As shown in FIG. 6, when fastening of the plate 21 and the shield stay 18 is cancelled by the clamp 30, the plate 21 can be moved upward and downward along the long hole 18a of the shield stay 18 while the guide member 211 is fitted to both side edges of the long hole 18a. When the plate 21 is moved upward and downward along the long hole 18a, the projection portions 211a of the guide member 211 are abutted with an upper end 17a1 or a lower end 17a2 of the long hole 18a so as to regulate upward movement or downward movement of the plate 21.

Figure 7:
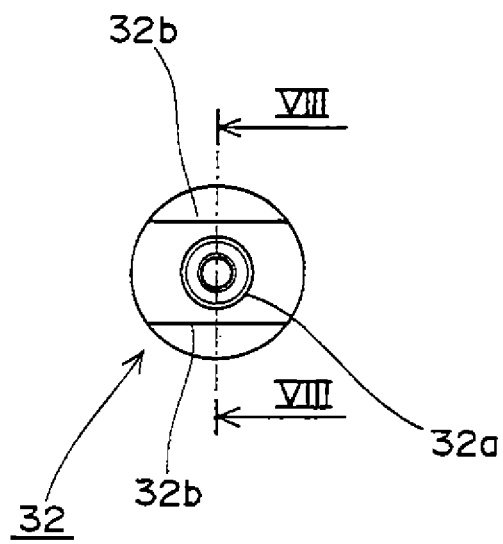
FIG. 7 is a plan view of a nut.
Figure 8:
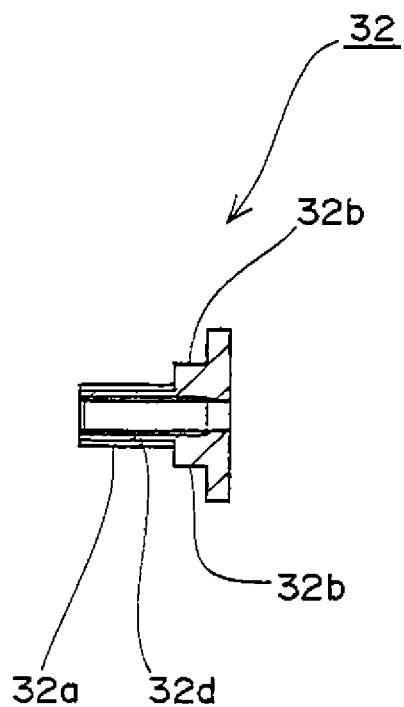
FIG. 8 is a sectional view by line VIII-VIII of FIG. 7.

FIG. 7 is a plan view of the tubular axial bolt 32, and FIG. 8 is a sectional view by line VIII-VIII of FIG. 7. Flat surface guide parts 32b to be abutted with both the side edges of the long hole 18a of the shield stay 18 are formed in a head part of the tubular axial bolt 32. The flat surface guide parts 32b have different radial sizes in the circumferential direction. A diameter on the short axis side is smaller than lateral width of the long hole 18a, and a diameter on the long axis side is larger than the lateral width of the long hole 18a. In a case where the tubular axial bolt 32 is moved upward and downward along the long hole 18a, the flat surface guide parts 32b are abutted with both the side edges of the long hole 18a and moved. As a result, turn of the tubular axial bolt 32 is prevented. On the rear side of the flat surface guide parts 32b, the head part 32c protruding in the lateral direction more than the flat surface guide parts 32b is formed.

As shown in FIG. 6, thickness (length in the front and rear direction) D1 of the long hole 18a is larger than the sum of thickness (length in the front and rear direction) D2 of the flat surface guide parts 32b and thickness (length in the front and rear direction) D3 of the guide member 211.

When the knob (operation portion) 31 is rotated and the knob 31 and the tubular axial bolt 32 are further fastened, a distance between the plate 21 and the tubular axial bolt 32 is shortened, so that the windshield 17 is brought closer to the shield stay 18. By nipping the shield stay 18 and the plate 21 so as to bring the front surface of the shield stay 18 and a rear surface of the plate 21 into contact with each other, the windshield 17 is fixed to the shield stay 18. When the knob 31 is rotated and the knob 31 and the tubular axial bolt 32 are loosened, the distance between the plate 21 and the tubular axial bolt 32 is extended, so that nipping of the shield stay 18 and the plate 21 is cancelled and the windshield 17 can be moved in the up and down direction relative to the shield stay 18.

As shown in FIG. 6, the retaining bolt 34 is inserted from the front side of the knob 31, and a head part 34a thereof is formed to have a larger diameter than a screw hole of the nut part 31c of the knob 31. The retaining bolt 34 is screwed to a screw hole 32d of the tubular axial bolt 32. As a result, even when the knob 31 is manually rotated and the knob 31 and the tubular axial bolt 32 are loosened, the retaining bolt 34 and the tubular axial bolt 32 are screwed together. Thus, movement of the knob 31 in the detachment direction is regulated. The cap 35 is attached to the knob 31 so as to close the screw hole of the nut part 31c of the knob 31 from the front side of the knob 31 and covers the head part 34a of the retaining bolt 34.

Hereinafter, a task of adjusting a position of the windshield 17 will be described.

Firstly, the left and right knobs 31 are manually rotated so as to loosen the knobs 31 and the tubular axial bolts 32. As a result, the fastening of the plates 21 and the shield stays 18 is cancelled.

Next, the knobs 31 are moved in the up and down direction along the shield stays 18. At this time, the plates 21 may directly be moved upward and downward along the shield stays 18 by gripping the shield stays 18. As a result, the plates 21 are moved upward and downward along the shield stays 18. The upward and downward movement of the plates 21 is performed in a state in which the guide members 211 attached to the plates 21 are fitted to both the left and right side edges of the long holes 18a of the shield stays 18. Thus, upon the movement of the windshield 17 in the up and down direction, displacement in the lateral direction is prevented.

After the windshield 17 is placed at a desired position in the up and down direction, the left and right knobs 31 are manually rotated so as to screw the knobs 31 and the tubular axial bolts 32 together and fasten the plates 21 and the shield stays 18. As a result, the windshield 17 is fixed at a desired position in the up and down direction.

According to the present embodiment, the following effects can be achieved.

(1) The fastening and fastening cancellation of the plates 21 and the shield stays 18 can manually be operated by the knobs 31. Thus, without using a tool, the windshield 17 can be moved. That is, the position of the windshield 17 can easily manually be changed.

(2) In the shield stays 18, surfaces of supporting the windshield 17 and surfaces secured to the plates 21 are the same surfaces against running wind. Thus, in comparison to a case where surfaces other than the support surfaces are secured to the plates 21, a structure of the shield stays 18 can be simplified. Further, regarding the shield stays 18, support of the windshield 17 against the running wind and height adjustment of the windshield 17 can be realized by the same members. Thus, the structure of the shield stays 18 can be simplified. Since the securing direction and the direction in which the running wind blows are the same, a reinforcing structure of the windshield 17 and the shield stays 18 can be simplified. Since the windshield 17 is coupled to the shield stays 18 via the plates 21 extending in the up and down direction, a load applied to the windshield 17 is divided and prevented from concentrating on one point. Thus, strength required for the windshield 17 is prevented from being excessive.

(3) The windshield 17 is attached to the shield stays 18 via the plates 21. Thus, in a case where the windshield 17 is moved, the windshield 17 is prevented from being damaged.

(4) The guide members 211 are fitted to both the left and right side edges of the long holes 18a. Thus, the plates 21 to which the windshield 17 is attached can be prevented from inclining relative to the long holes 18a, so that the windshield 17 can smoothly be moved.

(5) When the plates 21 are moved upward and downward along the long holes 18a, the projection portions 211a of the guide members 211 are abutted with the upper ends or the lower ends of the long holes 18a so as to regulate the upward movement or the downward movement of the plates 21. Thus, a moving amount of the windshield 17 can be regulated. Even when the fastening of the plates 21 and the shield stays 18 is loosened, the projection portions 211a are caught on the long holes 18a, so that the windshield 17 can be not easily dropped from the shield stays 18.

(6) The guide members 211 are attached to the long holes 18a at the holes 211c placed at intervals in the up and down direction. Thus, the plates 21 can be prevented from inclining relative to the long holes 18a. Further, the guide members 211 are formed in such a manner that the longitudinal direction thereof extends in the up and down direction, and both side edges in the lateral direction are fitted to the long holes 18a. Thus, the plates 21 can further be prevented from inclining relative to the long holes 18a. In such a way, the guide members 211 have a function of regulating movement of the windshield 17 in the direction other than the up and down direction. In the present embodiment, the projection portions 211a formed in the guide members 211 function as regulating portions for regulating the movement of the windshield 17 in the up and down direction. Thus, in comparison to a case where regulating portions are formed separately from the guide members 211, the attachment structure for the windshield can be simplified.

(7) The knobs 31 are provided in the front ends of the clamps 30 in the windshield thickness direction. Thus, the knobs 31 and the clamps 30 are not displaced from each other in the up and down direction and the lateral direction but placed on one axis. As a result, a configuration for transmitting a fastening force applied to the knobs 31 to the clamps 30 can be simplified. Specifically, rotation shafts of the knobs 31 and fastening shafts of the clamps 30 can be the same, so that the structure can be simplified.

(8) Fewer members are arranged around the front side of the windshield 17 than the rear side. Thus, the driver can easily access the front side. Since the knobs 31 are placed on the front side of the windshield 17, contact between the knobs 31 and other members can be prevented, and the knobs 31 can easily be operated.

(9) Since the knobs 31 are arranged on the front side of the windshield 17, that is, the knobs 31 and the shield stays 18 are arranged in line in the axial direction of the clamps 30, centers of the knobs 31 are arranged in parts where an eyesight of the driver is blocked by the shield stays 18 from the beginning, so that a decrease in the eyesight of the driver due to placement of the knobs 31 can be suppressed. Since the knobs 31 are arranged between upper ends and lower ends of the shield stays 18, parts of the knobs 31 protruding in the lateral direction from the shield stays 18 can be reduced, so that the decrease in the eyesight of the driver can be suppressed.

(10) The clamps 30 have a screw type securing structure for operating the fastening and the fastening cancellation by rotating the knobs 31, each of the clamps includes the tubular axial bolt 32 having the axial part inserted into the long hole and the plate and the head part having a larger diameter than the axial part, and the knobs 31 and the tubular axial bolts 32 are screwed together. Thus, by rotating the knobs 31, the fastening and the fastening cancellation can easily be operated.

(11) Each of the clamps 30 includes the retaining bolt 34 for regulating the movement of the knob 31 in the detachment direction. Thus, by the retaining bolts 34, the knobs 31 can be prevented from being detached and dropped. Further, loss of the knobs 31 can be prevented.

(12) Since the holes 16a into which the operation axial parts 31a of the knobs 31 are inserted are formed in the windshield 17, damage to the windshield 17 by the knobs 31 can be prevented.

(13) Since the caps 35 are attached to the knobs 31 so as to cover the retaining bolts 34, unnecessary contact with the retaining bolts 34 can be prevented.

(14) The shield stays 18 are provided toward the middle (centerline) on the rear side of the windshield 17. Thus, in comparison to a case where the shield stays are provided toward the side, the windshield 17 receiving wind pressure from the front side can stably be supported. The left and right shield stays 18 are provided in pairs. Thus, in comparison to a case where only one shield stay is provided, the windshield 17 can be moved in the up and down direction while stably supporting the windshield 17. In a comparison to a case where three or more shield stays are provided, the movement of the windshield 17 in the up and down direction can smoothly be performed.

(15) The knobs 31 and the tubular axial bolts 32 are placed in the substantial centers in the up and down direction between the upper and lower bolts 22. Thus, by screwing the knobs 31 and the tubular axial bolts 32 together, the plates 21 are stably supported on the shield stays 18. Since the plates 21 are attached to the windshield 17, the windshield 17 can stably be supported.

In the above embodiment, the guide members 211 are attached to the plates 21. However, by integrating the plates 21 and the guide members 211, guide portions may be provided in the plates.

In the above embodiment, the long holes 18a are formed in the shield stays 18 and the guide members 211 are attached to the plates 21. However, the guide members may be attached to the shield stays and the long holes may be formed in the plates.

In the above embodiment, when the plates 21 are moved upward and downward along the long holes 18a, the projection portions 211a of the guide members 211 are abutted with the upper ends or the lower ends of the long holes 18a so as to regulate the upward movement or the downward movement of the plates 21. However, when the plates 21 are moved upward and downward along the long holes 18a, tip ends of the bolts 22 for attaching the plates 21 to the windshield 17 may be abutted with the upper ends or the lower ends of the long holes 18a so as to regulate the upward movement or the downward movement of the plates 21. In this case, preferably, the tip ends of the bolts 22 are screwed to nuts formed by elastic materials or the tip ends of the bolts 22 are covered by elastic materials or the like. Since the bolts 22 have the above configuration, contact of main bodies of the bolts 22 with the upper ends or the lower ends of the long holes 18a and damage thereof can be prevented.

Figure 9:
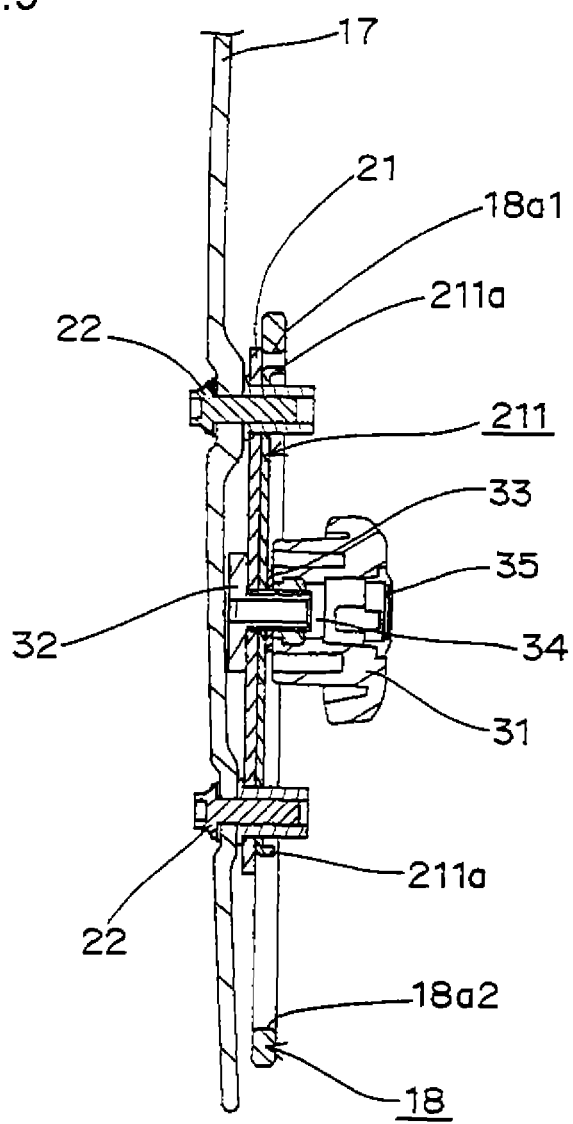
FIG. 9 is a sectional view showing another embodiment of the present invention.

In the above embodiment, the knobs 31 are placed in the vicinity of the front part of the windshield 17. However, as shown in FIG. 9, the knobs may be placed in the vicinity of a rear part of the windshield 17. By placing the knobs 31 in the vicinity of the rear part of the windshield 17, an influence of air resistance of the knobs 31 can be ignored. It should be noted that in this case, positions of the knobs 31 and the tubular axial bolts 32 in the front and rear direction are opposite.

Figure 10:
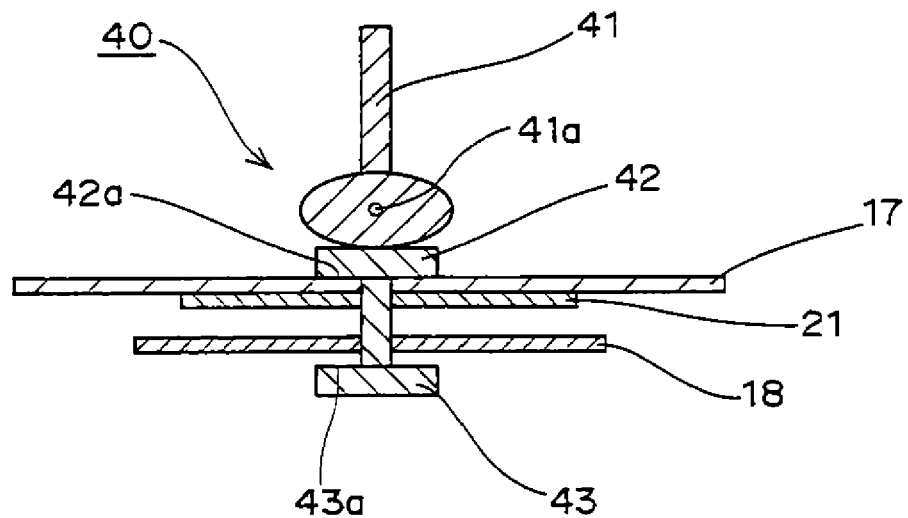
FIG. 10 is a view showing another embodiment of a clamp.
Figure 11:
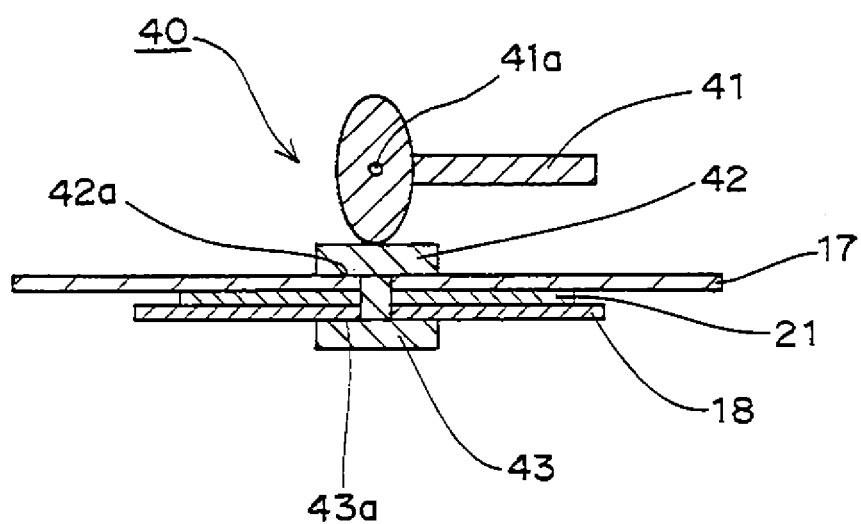
FIG. 11 is a view showing a state that an angle of a lever is changed in FIG. 10.

In the above embodiment, the clamps 30 have the screw type securing structure for operating the fastening and the fastening cancellation by rotating the knobs 31. However, the clamps of the present invention are not limited to the screw type securing structure but may have any structure capable of operating the fastening and the fastening cancellation of the plates 21 and the shield stays 18. For example, clamps 40 as shown in FIGS. 10 and 11 may be applied. Each of the clamps 40 has a lever 41 whose angle is manually changeable about a rotation center 41a, and nipping members 42 and 43 for nipping and supporting a member. In the clamp 40, when the angle of the lever 41 is changed from a state shown in FIG. 10 to a state shown in FIG. 11, a gap between the nipping member 42 and the nipping member 43 is decreased, so that the windshield 17, the plate 21, and the shield stay 18 placed between the nipping member 42 and the nipping member 43 are fastened. When the angle of the lever 41 is changed about the rotation center 41a from the state shown in FIG. 11 to the state shown in FIG. 10, the gap between the nipping member 42 and the nipping member 43 is increased, so that fastening of the windshield 17, the plate 21, and the shield stay 18 placed between the nipping member 42 and the nipping member 43 is cancelled. A facing surface 42a of the nipping member 42 to the nipping member 43 and a facing surface 43a of the nipping member 43 to the nipping member 42 are respectively flat surfaces as shown in FIGS. 10 and 11. However, the facing surfaces may respectively be formed to be uneven in order to enhance a retaining property of the windshield 17, the plate 21, and the shield stay 18 placed between the nipping member 42 and the nipping member 43.

In the above embodiment, the description is given with using the motorcycle. However, the present invention can be applied to any vehicle in general provided with a windshield on the front side of the driver in addition to the motorcycle. For example, the present invention can favorably be used for a riding type vehicle such as a small planing boat, a buggy vehicle, and an all terrain vehicle. Further, the present invention can favorably be applied to a vehicle having a steering handle, the vehicle being provided with a windshield on the front side of the steering handle.

The present invention is not limited to the configuration described in the above embodiment but can include various modified examples obtained by those skilled in the art without departing from the content described in the claims.

INDUSTRIAL APPLICABILITY

Since the attachment structure for the windshield capable of more easily manually changing the position of the windshield can be provided, the present invention has a great industrial utility value.

REFERENCE SIGNS LIST

1 Motorcycle
2 Front wheel
3 Rear wheel
4 Front fork
5 Steering shaft
6 Head pipe
7 Steering handle
8 Vehicle body frame
9 Swing arm
10 Pivot bolt
11 Fuel tank
12 Seat
13 Engine
14 Chain
15 Headlight
16 Front cowl
17 Windshield
18 Shield stay
18a Long hole
19 Coupling member
21 Plate
211 Guide member
211a Projection portion
22 Bolt
30 Clamp
31 Knob
32 Tubular axial bolt
33 Washer
34 Retaining bolt
35 Cap
40 Clamp
41 Lever
42 Nipping member
43 Nipping member

The invention claimed is:

1. An attachment structure for a windshield to be located at an upper part of a front portion of a vehicle body of a vehicle, said attachment structure comprising:
   a plate to be attached to the windshield;
   a shield stay to be attached to a vehicle body; and
   a clamp for holding said plate and said shield stay together from a front side and a rear side of said plate and said shield stay, both said plate and said shield stay being located at the same side of the windshield, said clamp including an operation portion configured to allow manual fastening of said clamp to fix a position of the windshield and allow manual unfastening of said clamp to allow upward and downward position adjustment of the windshield along said shield stay, said clamp being arranged and configured to apply a clamping force to said plate and said shield stay in a thickness direction of the windshield.

2. The attachment structure of claim 1, wherein one of said shield stay and said plate has an elongated hole extending along an upward and downward direction, the other of said shield stay and said plate having an abutting portion abutting both a left side and a right side of the elongated hole and extending along the upward and downward direction.

3. The attachment structure of claim 1, wherein said clamp includes a retaining member for limiting movement of said operation portion in a detachment direction so that said operation portion does not become detached from said clamp.

4. The attachment structure of claim 1, wherein said operation portion includes a grip part to be gripped and an operation axial part coupled to said grip part, said operation axial part to be inserted into a hole in the windshield.

5. The attachment structure of claim 2, wherein said clamp has a tubular axial bolt for fastening said plate and said shield stay together, said tubular axial bolt penetrates through said elongated hole.

6. The attachment structure of claim 2, wherein said plate and said shield stay are each one of a pair of left and right plates and left and right shield stays, respectively.

7. The attachment structure of claim 1, wherein said operation portion is located on a first end of said clamp with respect to the thickness direction of the windshield, and said operation portion is located at a front side of the windshield.

8. The attachment structure of claim 1, wherein an outer peripheral part of the operation portion is to be gripped and rotated by an operator.

9. The attachment structure of claim 1, wherein said plate is fixed in position relative to the windshield such that the windshield is unmovable relative to said plate.

10. The attachment structure of claim 9, wherein said plate is attached to the windshield by bolts.

* * * * *